US010069305B2

(12) United States Patent
Tagliaro et al.

(10) Patent No.: US 10,069,305 B2
(45) Date of Patent: Sep. 4, 2018

(54) APPARATUS AND PROCEDURE FOR THE IMMISSION OF ELECTRIC ENERGY (71) Applicant: FUTURE LAB S.R.L., San Bonifacio (IT)

(72) Inventors: Dario Tagliaro, Lonigo (IT); Francesco Ulian, Lonigo (IT)

(73) Assignee: FUTURE LABS S.R.L., San Bonifacio (IT)

( * ) Notice: Subject to any disclaimer, the term of this patent is extended or adjusted under 35 U.S.C. 154(b) by 337 days.

(21) Appl. No.: 14/785,570

(22) PCT Filed: Apr. 24, 2014

(86) PCT No.: PCT/IB2014/060974
§ 371 (c)(1),
(2) Date: Oct. 19, 2015

(87) PCT Pub. No.: WO2014/174476
PCT Pub. Date: Oct. 30, 2014

(65) Prior Publication Data
US 2016/0087438 A1 Mar. 24, 2016

(30) Foreign Application Priority Data
Apr. 24, 2013 (IT) .............................. VR2013A0099

(51) Int. Cl.
H02J 3/32 (2006.01)
H02J 3/38 (2006.01)
H02J 7/35 (2006.01)

(52) U.S. Cl.
CPC ................ *H02J 3/382* (2013.01); *H02J 3/32* (2013.01); *H02J 3/383* (2013.01); *H02J 3/386* (2013.01); *H02J 7/35* (2013.01); *Y02B 10/14* (2013.01); *Y02E 10/563* (2013.01); *Y02E 10/566* (2013.01); *Y02E 70/30* (2013.01)

(58) Field of Classification Search
CPC .................................. H02J 3/383; H02J 3/386
See application file for complete search history.

(56) References Cited

U.S. PATENT DOCUMENTS

| 7,839,025 B2 * | 11/2010 | Besser .................. H02J 7/0068 307/99 |
| 7,977,818 B1 | 7/2011 | Wahl |
| 2002/0067628 A1 | 6/2002 | Takehara et al. |
| 2012/0223578 A1 | 9/2012 | Bartelt-Muszynski |

FOREIGN PATENT DOCUMENTS

| DE | 19630432 A1 | 1/1998 |
| EP | 2475060 A1 | 7/2012 |

* cited by examiner

Primary Examiner — Jeffrey Shin
(74) Attorney, Agent, or Firm — Oliff PLC (57) ABSTRACT An apparatus and a procedure for the immission of electric energy supplied by a device supplying electric energy in a preexisting electric circuit, connected to a source of electric energy, in which one or more electric users may be connected to the electric circuit. The apparatus includes an adjusting device that makes the electric circuit autonomous so as to avoid that the source of electric energy has to supply electric energy to the same electric circuit.

15 Claims, 6 Drawing Sheets

APPARATUS AND PROCEDURE FOR THE IMMISSION OF ELECTRIC ENERGY

The present invention refers, in general, to an apparatus for the immission of electric energy. In particular, the present invention refers to an apparatus that is capable of entering electric energy in an electric circuit and/or electric system to which the apparatus is connected.

As is known, on the market there are different types of equipments to enter electric energy in electric circuits and/or electric systems, in which the energy comes from an energy source and is adapted to the conditions of use that must be manageable for the specific electric user of final destination.

The installations for the production and immission of electric energy, for instance photovoltaic energy, wind energy, photovoltaic concentrator energy and/or cogeneration energy, enter electric energy in civil and/or industrial electric systems connected to the public power grid through a meter. Basically, there are two types of installations for the production and immission of electric energy, namely, installations intended for the self-consumption of energy and/or installations intended for the sale of energy to the free market.

Then, these types of applications require a new Declaration of Compliance of the electric system modified owing to the nature of their composition. In fact, it is necessary to carry out energized connections of panels, new electric connections, and make changes in an existing electric system, the study of a dimensioning plan, checks and tests of the installation and more.

Accordingly, the present design and installation procedure does not allow anyone to directly connect a plant for the production of energy to existing electric systems.

Thus, such interventions must be carried out by qualified personnel and then, it is necessary to request the issue of a Declaration of Compliance of the electric system, the Declaration of Compliance being mandatory for all types of plants for the production and immission of energy in the power network, commonly called power grid, which requires changes to the existing electric system.

In order to understand the complexity of these operations, it is possible to refer to the rules, for instance the rule CEI 1 1-27, which provides for that the electric works can be carried out only by skilled personnel. The qualified personnel is denoted by the acronym PES while the warned personnel is denoted by the acronym PAV.

The persons who are not included in the categories PES and PAV are called common persons in the rules and are denoted by the acronym PEC. The common persons can perform electric works but without tension and only under the surveillance or the supervision of PAV or PES personnel.

The realization of an installation for the production and input of energy for the sale and/or self-consumption requires, therefore, a complex series of operations and evaluations to be performed or accomplished by skilled personnel, trained in accordance with the current legislation.

Besides, said installations are subjected to the adaptation of the public network meter of the user with a new bidirectional meter in replacement of the unidirectional meter so that there is a long series of requests and procedures to obtain the possibility of measuring the energy flux in both directions, from and to the public power grid.

Below, reference is made to photovoltaic systems for domestic users, but it is intended that one skilled in the art will be able to adapt the evaluations and features to whatever other user and/or whatever other electric system and/or whatever other source of electric energy. DE 20 201 1 003799 U1 discloses a device to directly feed external users with electric energy obtained from renewable sources, comprising an internal feeding network to which a series of connections are connected to supply electric energy to the external users. The internal feeding network is controlled internally and is fed by generators taking advantage of renewable energies, batteries, a central external feeding system or a combination of these three sources. The external users may be connected only to the connections of the device itself to use the electric energy supplied by the generators using renewable energies or batteries. In comparison with a central feeding system, said device has the same features of a continuity unit with battery to which an energy source is added.

US 2002/067628 A1 discloses an apparatus of interconnection utilizing alternating current and having an input terminal to receive electric energy from an external central feeding system, an input for the electric energy produced by a photovoltaic panel, an output connection to feed an electric user and an inverter that turns the electric energy coming from the photovoltaic panel into alternating current. The apparatus controls the emission of the inverter and measures the current intensity that is utilized by the electric user with a current intensity meter positioned proximate to the output connection. When the electric power absorbed by the electric user, calculated by multiplying the measured intensity of current with the voltage of the external feeding system, exceeds the electric power issued by the inverter, the apparatus blocks the inverter itself, in order to avoid that electric energy, produced by the inverter, enters the external central feeding system.

U.S. Pat. No. 7,977,818 B1 discloses an apparatus and a system to avoid electric overloads in a branch of an existing electric circuit when a part of the electric energy used by the electric circuit is supplied by a renewable energy source through a socket of said electric circuit. The system controls the intensity of the current fed in the electric circuit by the apparatus so that the intensity of the total current of the circuit does not exceed the limit of the capacity of the electric circuit.

Figure 1:
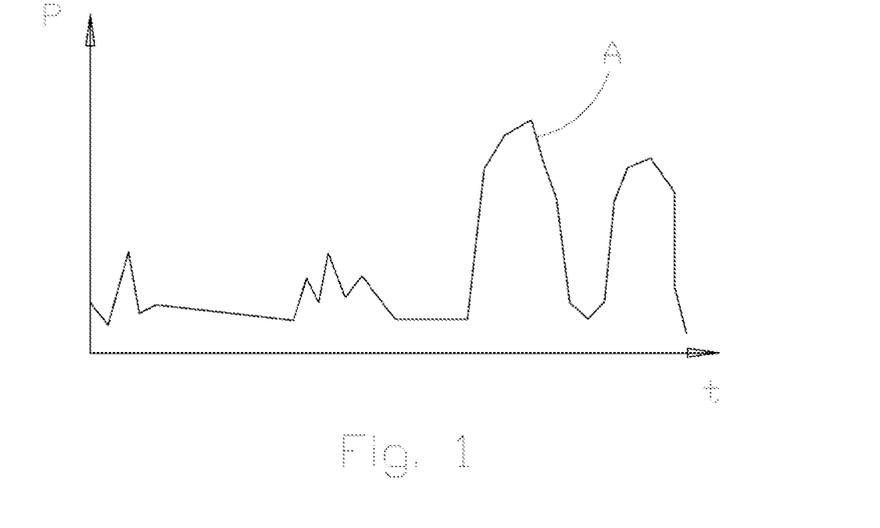
FIGS. 1 and 2 are two exemplifying graphs relating to an example of consumption of electric energy and an example of production of electric energy from renewable sources.

With reference to a suitable domestic installation utilizing a photovoltaic system with on-site exchange and to FIG. 1 showing an exemplifying graph having Time on the abscissa and Electric Power on the ordinate, A denotes a curve representing the daily consumption of a generic domestic user. As from FIG. 2, a curve B representing the production of electric energy of a known photovoltaic plant is superimposed on the graph in FIG. 1.

Figure 2:
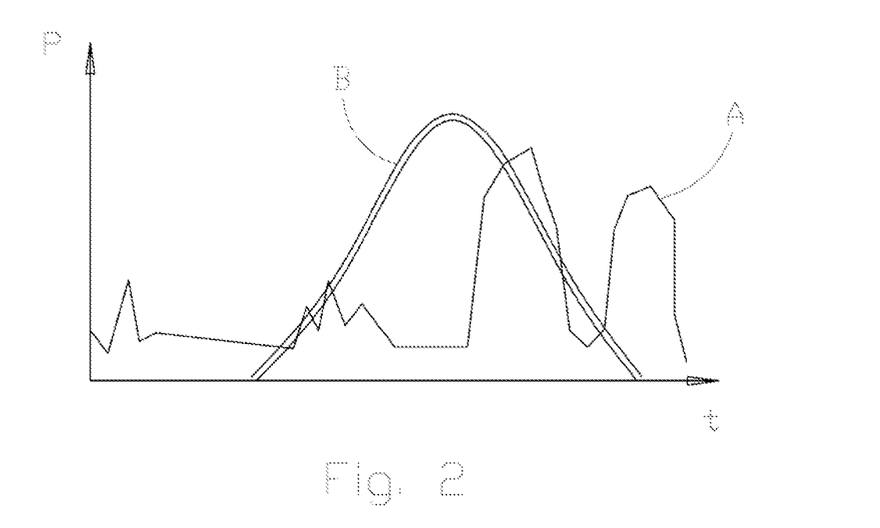

As it can be seen easily, the curve B is not capable to completely cover the curve A. In other words, the instantaneous production of the known photovoltaic plant is not capable to satisfy the consumption of the domestic user over the whole day.

Typically, when the renewable source supplying the electric energy is not available, for instance in the hours of the night in the case of a photovoltaic system, the electric energy required by a domestic user has to be supplied by the public power grid.

In order to increase the share of self-consumption of energy produced by renewable sources and, consequently, to reduce the demand for electric energy from the public power grid, the prior art provides for an assignment of the excess electric energy to the public power grid, the excess electric energy being counted by means of bidirectional meters. Otherwise, the excess electric energy is stored in storage systems that store the electric energy supplied but not self-consumed so that the stored excess electric energy may be supplied to the domestic user when necessary, without having to resort to the public power grid.

Below is a description of a house as a non-limiting example of an electric circuit and/or an electric system, as reference for the description of prior art and invention.

Figure 3:
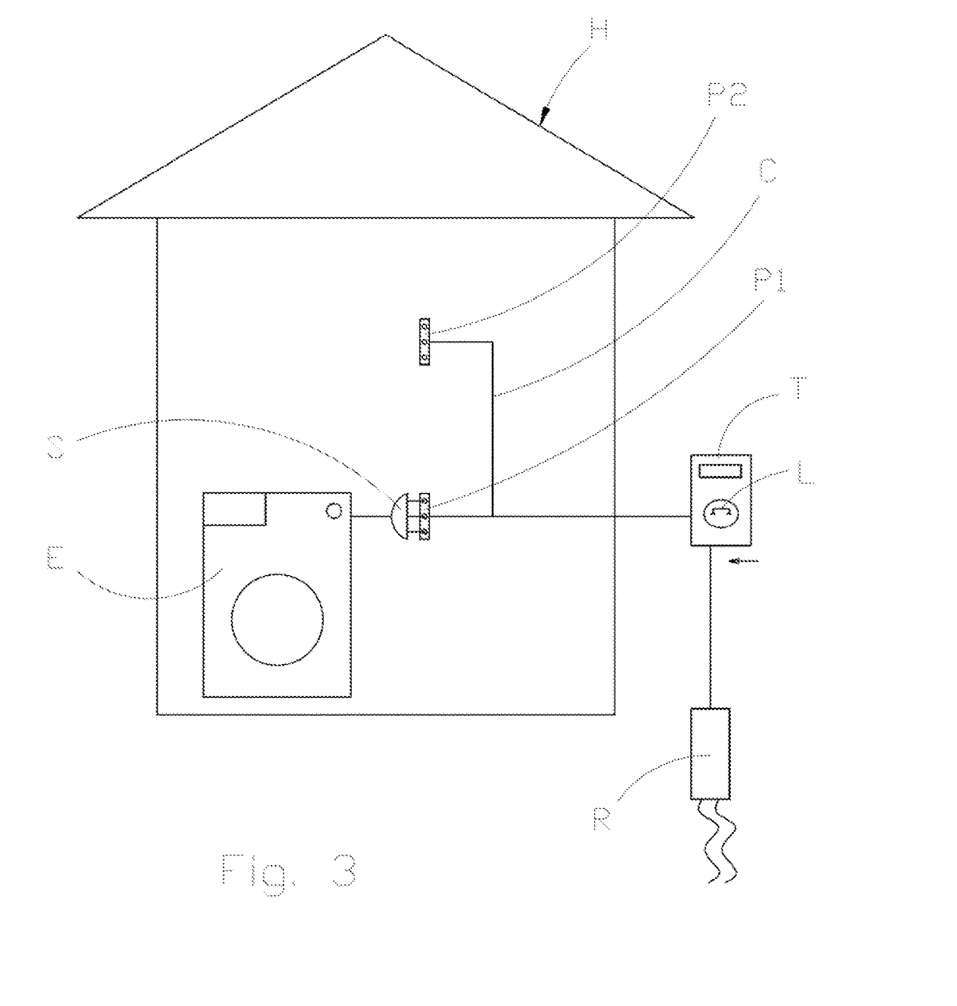
FIG. 3 is a schematic view of a house according to prior art.

As visible in FIG. 3, a house H comprises an electric circuit C, connected to a unidirectional meter T which in turn comprises a lever L.

The unidirectional meter T is electrically connected to the public power grid R while the electric circuit C ends with a first electric socket P1 and a second electric socket P2. A user E, for instance a washing machine, is connected through a plug S to the first electric socket P1. The user E works by using the electric energy supplied through the electric circuit C by the public power grid R.

If the house H is equipped with a system for the production of energy, it is necessary that this system has a power of immission proportional to the power of the installed generator. The energy produced is completely fed into the existing electric circuit C, which makes a connection system mandatory to modify the structure. In this case, a new Declaration of Compliance of the electric circuit C is necessary. In fact, the public power grid R requires a control of the electric energy produced in order to avoid imbalances. Accordingly, it is not possible to provide only a system for the production of energy in the house H in FIG. 3 but it is indispensable to adapt the electric system of the house. This adaptation requires the intervention of a PES or PAV specialist.

The energy produced is partially self-consumed by the users connected to the electric circuit C of the house H while the excess of energy produced is fed into the public power grid R through a new bidirectional meter, installed in substitution of the meter T.

Figure 4:
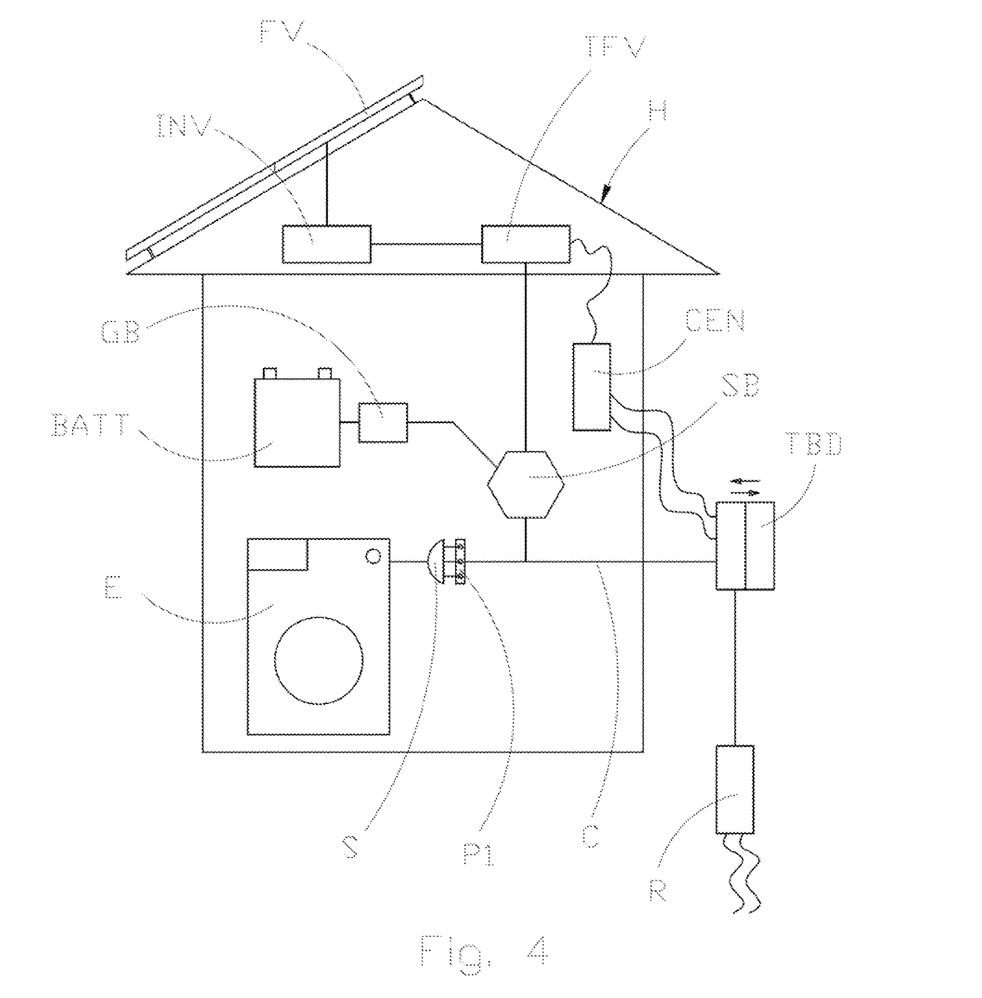
FIG. 4 shows the house in FIG. 3 provided with a photovoltaic system for the production of electric energy, carried out according to prior art.

As visible in FIG. 4, in the house H it is possible to install a system comprising a photovoltaic generator FV whose energy is converted into an alternating current by an inverter INV, counted by a photovoltaic production meter TFV and transmitted to an exchanger SB. The whole system is controlled by a controller CEN that interfaces with the photovoltaic production meter TFV and a bidirectional meter TBD.

The energy that has not been self-consumed by the users is stored in accumulators BATT that store said overproduction of energy by means of a battery handler GB but when the energy stored in the accumulators BATT has to be used, the controller CEN insulates the house from the public power grid R and creates a condition of "stand-alone system". The return to a grid condition of connection to the public power grid R takes place only when the energy reserve, stored previously in the accumulators BATT, is finished.

However, notwithstanding this stratagem it is still necessary to replace the meter T with a bidirectional meter. The replacement is usually a responsibility of the managers of the public power grid. In case of a supply of generated power to the public power grid, the bidirectional meter has to supply energy to the public power grid according to the criteria of the legislation.

The value of the energy supplied to the public grid and not self-consumed is balanced later to the user on taking into account the actual market values that always correspond to a value much lower than the purchase cost of electric energy from the public power grid.

Especially for that reason, a system for the production of energy is usually built with powers much greater than the actual need of the user in order to compensate for this economic adjustment difference.

For instance, for a house having an average consumption of 2 kW (instantaneous) it is possible to install photovoltaic systems having up to 6 kW of peak power.

The aim of the present invention is to carry out an apparatus for the immission of electric energy so as to overcome the problems of the known systems.

Another aim is to carry out an apparatus for the immission of electric energy, which comprises elements which can be handled by whatever non-specialized user in a quick simple way.

Another aim is to carry out an apparatus for the immission of electric energy, which does not need interventions on the electric circuits and/or the system to which the apparatus is coupled.

All the above-mentioned aims and other ones are achieved according to the invention through an apparatus for the immission of electric energy supplied by a delivery device supplying electric current to a pre-existing electric circuit to which at least an electric user may be connected, said pre-existing electric circuit being connected to an electric energy source, for instance the public power grid delivering electric energy at a first voltage.

The apparatus comprises connecting means for the connection of the delivery device feeding the pre-existing electric circuit and is characterized by the fact of comprising also detecting means that detect the electric energy to be delivered to the pre-existing electric circuit, and adjusting means that are connected to the detecting means and to the connection means.

In particular, the adjusting means are capable to adjust the electric power delivered by the delivery device supplying electric current to the pre-existing electric circuit according to the value detected by the detecting means, and to set the voltage of the electric current supplied by the delivery device to the preexisting electric circuit to a second voltage greater than the first voltage.

Through the apparatus according to the invention, it is possible to make essentially null the electric current delivered by the source of electric energy, namely the public power grid, so as to make completely autonomous the preexisting electric circuit that will be fed only by the apparatus and therefore, by the delivery device supplying electric energy, such as a photovoltaic panel or a wind turbine.

Advantageously, the detecting means may comprise a detecting device for the detection of the electric energy flowing between the pre-existing electric circuit and the source of electric energy, for instance the public power grid, so as to control and quantify the amount of electric energy delivered to the electric circuit by the source of electric energy and vice versa. Thus, the apparatus may provide that the adjusting means adjust the electric energy supplied by the device feeding the electric circuit so that the flow of electric current between the pre-existing electric circuit and the source of electric energy is null.

In particular, the detecting device may comprise a first control adapted to measure the intensity of the current flowing from the pre-existing electric circuit to the source of electric energy. Besides, the detecting device may comprise a second control adapted to measure the intensity of the current flowing from the source of electric energy to the pre-existing electric circuit.

In addition, the detecting means may comprise a detector of the electric power required by the electric circuit from the source of electric energy so as to quantify the request for electric energy of the electric circuit and to ensure that the adjusting means adjust the electric energy supplied by the delivery device to the electric circuit on the base of said electric power required. In this way, it is possible to avoid any flow of electric current between the pre-existing electric circuit and the source of electric energy.

Advantageously, the apparatus according to the invention may be applied to an electric circuit connected to a pre-existing meter that measures the electric energy required to the source of electric energy, said meter being adapted to generate conveyed waves to send pieces of information regarding the pre-existing electric circuit including the electric power required by the pre-existing electric circuit from the source of electric energy according to the prior art. In this case, the detector may comprise a reader of conveyed waves adapted to read the conveyed waves generated by the meter and entered in the electric circuit.

Through the presence of said reader, the apparatus is capable to detect the electric power required by the electric circuit to the energy source, for instance the public power grid, with a direct reference to the measurement of the meter.

Besides, in case the meter is structured according to law and has a lever to control the connection of the electric circuit to the source of electric energy, namely the public power grid, the apparatus according to the invention may comprise a release or reset device comprising at least an arm adapted to act on the lever to release or reset the meter when predetermined conditions occur, for instance in case there is a risk of flowing of electric current from the electric circuit to the public power grid.

Advantageously, the apparatus may provide that the delivery device supplying electric current comprises a generator of electric energy and/or an accumulator of electric energy, and in which means of immission of electric energy are comprised and are connected to the generator and/or to the accumulator of electric energy and are adjusted by means which adjust the power so as to accumulate the electric energy produced by the generator of electric energy and not entered simultaneously. In this way, it will be possible to input at a later time the electric energy stored in the accumulator.

Advantageously, the adjusting means may comprise a tracking device adapted to minimize the electric energy flowing from the source of electric energy to the pre-existing electric circuit and/or to minimize the electric power required by the electric circuit to the source of electric energy.

In addition, the advantages and aims of the invention are also achieved by a household appliance for the immission of electric energy through a pre-existing socket of a pre-existing electric circuit in a building connected through a preexisting meter to an outer electric grid corresponding to a source of electric energy, the pre-existing electric circuit being capable to feed at least one electric user.

In particular, the household appliance is characterized by the fact of comprising an apparatus as defined above and in which the means of connection to the pre-existing circuit consist of a connection to connect the household appliance to the socket of the pre-existing electric circuit so that the household appliance may input electric energy directly in the pre-existing circuit of the building in order to deliver an electric power slightly lower than the power required by the pre-existing electric circuit, and simultaneously not to enter electric energy into the external power grid.

Besides, the aims and advantages of the invention are achieved through a procedure of immission of electric energy supplied by a delivery device supplying electric current to a pre-existing electric circuit to which at least an electric user may be connected, said pre-existing electric circuit being connected to a source of electric energy, for instance to the public power grid delivering electric energy at a first voltage.

In particular, the procedure is characterized by the fact of comprising the following phases:
  measuring the electric power required by the electric circuit and detecting a first electric power;
  inputting electric energy in the electric circuit at a second electric power and at a second voltage, the second voltage being higher than the first voltage;
  determining the electric power required by the electric circuit to the source of electric energy and detecting a third electric power;
  adjusting the second electric power so that the third electric power is positive and close to zero.

Essentially, the procedure allows to make the pre-existing electric circuit substantially autonomous, for instance from the public power grid, or from the source of electric energy. This autonomy takes place when the electric power required by the electric circuit to the source of electric energy, namely the public power grid, is almost null because almost all of the power required by the same electric circuit is met by the supply of the delivery device supplying electric energy, suitably adjusted.

In particular, the procedure of immission of electric energy according to the invention is advantageous because although the pre-existing electric circuit is still powered with electric energy by the public power grid, it is sufficient that the electric power supplied by the delivery device to the electric circuit is greater than 0 W and lower than the electric power required by the electric circuit.

Advantageously, in order that the procedure of immission of energy allows a total or substantial autonomy of the electric circuit from the source of electric current, the electric power required by the electric circuit to the source of electric energy may be greater than 0 W and lower than 2 W.

Besides, the measurement of the electric power required by the electric circuit, determined as first electric power, may be performed by summing the second electric power of the electric energy input in the electric circuit to the third electric power corresponding to the electric power required by the electric circuit from the source of electric energy. In so doing, once the electric power input in the electric circuit, namely the second electric power, is known, it is sufficient to detect the value of the third electric power in order to obtain the total value of the electric power required by the electric circuit.

Said operation may be performed at any time, even if the loads of the one or more electric users connected to the electric circuit vary.

Advantageously, the procedure of immission of electric energy may comprise also the following phases:
  measuring the electric energy delivered by a generator of electric current, included in the device supplying electric energy, by detecting a fourth electric power;
  in case the fourth electric power is greater than the second electric power, the electric energy that has not been input in the electric circuit is stored in an accumulator of electric energy.

In so doing, it is possible to store the excess electric energy.

Besides, this procedure provides that in case the fourth electric power is lower than the second electric power, the electric energy stored in the accumulator of electric energy is fed into the pre-existing electric circuit. In this way, the stored electric energy may compensate for a possible failure of an electric energy generator that is not capable to meet the requirements of the electric circuit.

Advantageously, when a meter is connected to the pre-existing electric circuit in accordance with the regulations to measure the electric power required by the pre-existing electric circuit to the energy source, the determination of the third electric power takes place by detecting from the meter the value of the electric power required by the pre-existing electric circuit to the energy source.

In particular, since the meter according to rules is adapted to emit conveyed waves to send pieces of information concerning the pre-existing electric circuit including the electric power required by the pre-existing electric circuit to the energy source, the detection from the meter of the value of the third electric power takes place by reading the conveyed waves emitted by the meter.

In this way, through the reading of the conveyed waves emitted by the meter, it is possible to detect the electric power required by the electric circuit to the energy source, for instance the public power grid, only with a direct reference to what is measured by the meter without the need to install further devices and obtaining a precise value of what would be required from the source of electric current, namely the public power grid.

Advantageously, in case electric energy flows from the pre-existing electric circuit to the source of electric energy, or in case there is only a remote possibility that this fact could happen, the procedure of immission of electric energy according to the invention may provide to disconnect the electric circuit from the source of electric energy.

Likewise, said disconnection may be done in case the electric power required by the pre-existing electric circuit to the energy source is 0.

Through said condition of disconnection it is possible to disconnect the electric circuit from the source of electric energy also in the presence of meters that are not capable of measuring any flows of electric energy from the preexisting electric circuit to the source of electric energy. In fact, the reading equivalent to 0 of the electric power required by the pre-existing electric circuit from the source of electric energy could be considered as the limit threshold that, once it has been exceeded, would signal that the electric power input into the inside of the pre-existing electric circuit is no more only absorbed by the preexisting electric circuit itself but an immission of electric energy is about to happen into the same source of electric energy.

Besides, in order to avoid damages to the pre-existing electric circuit, the procedure according to the invention may provide that the second electric power is adjusted so as to be lower than the maximum electric power sustainable by the pre-existing electric circuit.

Further details and features of the invention will be better understood from the following description that is supplied as a non-restricting example as well as from the accompanying drawings wherein.

Figure 5:
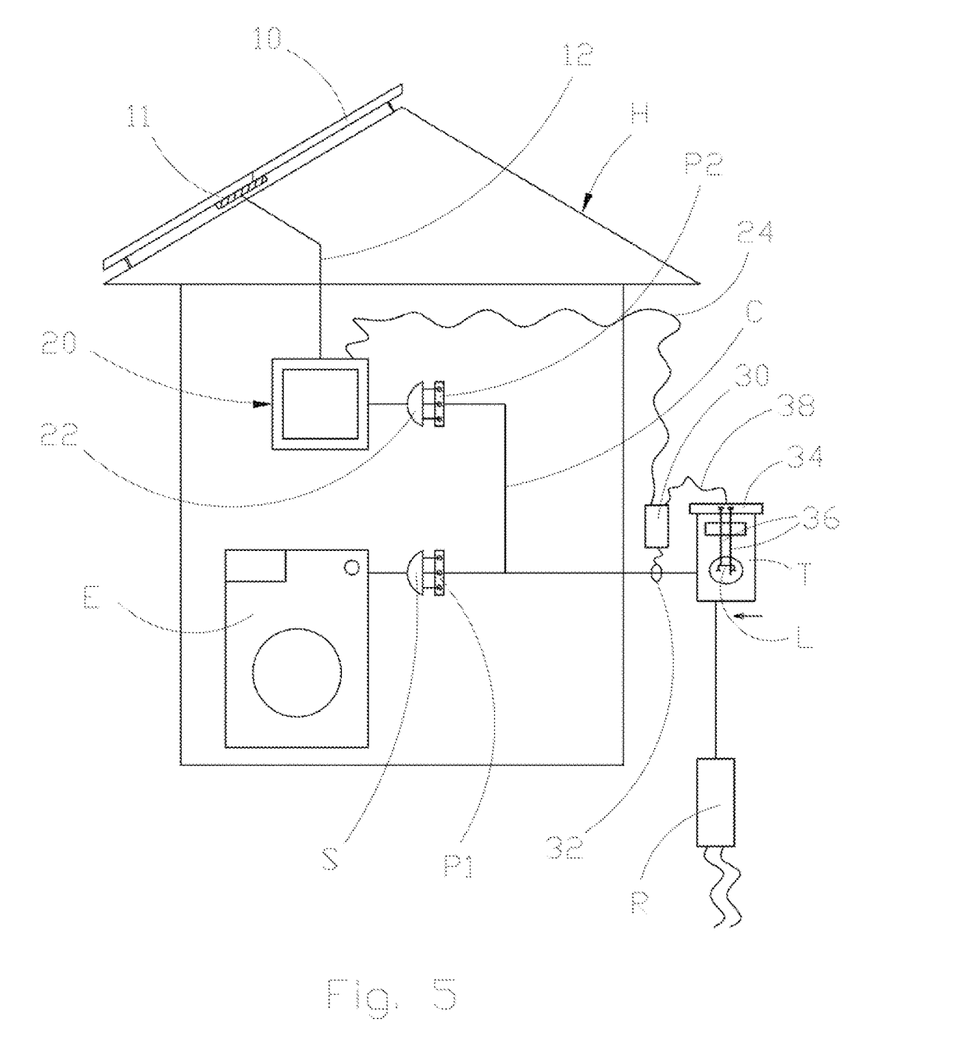
FIG. 5 shows the house in FIG. 3 with an apparatus for the immission of electric energy, carried out according to the invention.

With reference to FIG. 5, number 10 denotes a generator of electric energy, in particular a photovoltaic panel, connected to a board 20 of transformation of energy by means of a box 11 and a first connection 12.

The board 20 is connected to a second socket P2 by means of a known plug 22, compatible with the socket P2, and to a control 30 by means of a connection wire 24. The control 30 is optional as described below.

The connection wire 24 is represented with a thread between the board 20 and the control 30 but it is intended that the board 20 can be commutated by means of the control 30 through other means of connection such as a wireless connection, or a modulated wave connection.

The control 30, which is suitable positioned proximate to the meter T of the house H, comprises a ring 32 surrounding the portion of circuit C that goes out of the meter T. The function of the ring 32 will be described below.

A release or reset device 34 is suitably connected to the meter T so as to cooperate with the lever L by means of two arms 36. Obviously, also the device 34 is optional.

The device 34 communicates with the control 30 through connecting means 38, represented in FIG. 5 by means of a thread. However, the connecting means can be realized in a wireless modality. In addition, the device 34 can communicate also with the board 20.

Below, the above-mentioned elements are described in detail. Such elements may be considered as components of a kit for the immission of electric energy.

Said kit may be suitably formed by one or more of the elements described above and below, according to the electric circuit or type of electric user to which said elements are connected each time. Through the particular construction and typology of connection utilized, the apparatus and the kit according to the invention may be used by any person or PEC like the household appliances.

Figure 6:
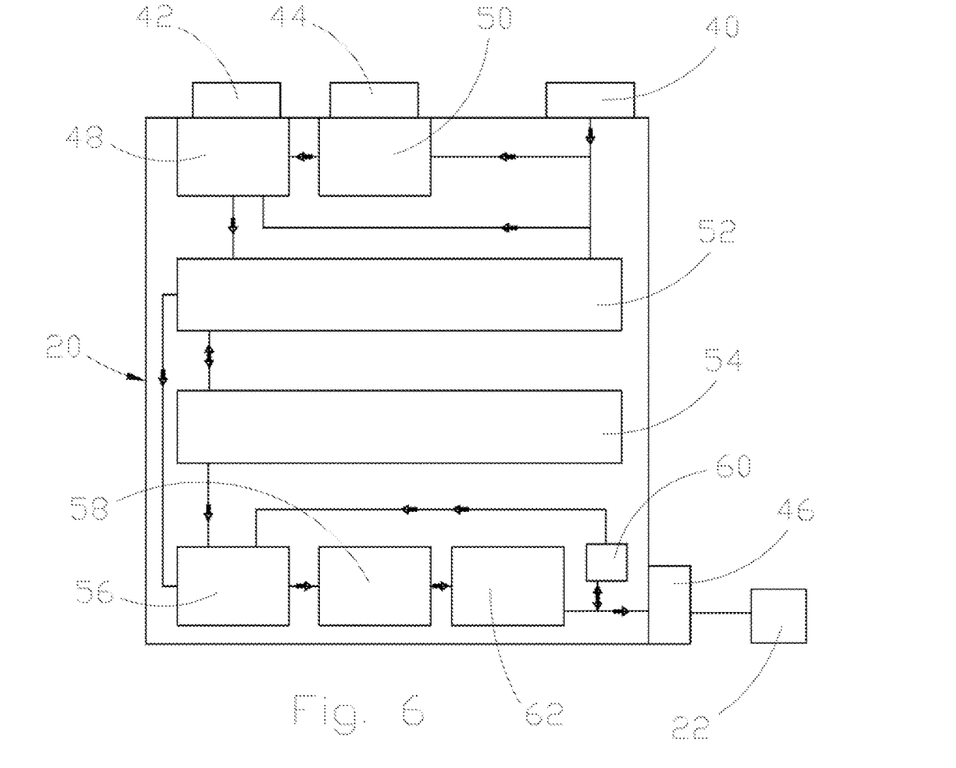
FIGS. 6 to 8 show details of several elements of the apparatus according to the invention.

As visible in FIG. 6, the board 20 for the transformation of energy comprises interface elements and internal elements. The figure illustrates the operative and functional connections between the interface elements and the internal elements, and between internal elements, one or more arrows denoting the more convenient directions of the flows of electric energy and/or information.

The interface elements include a starting switch 40, a first port 42 for direct currents, a second port 44 for alternating currents and an output 46. The plug 22, in particular a civil plug, an industrial plug or another type of plug, is connected to the output 46 comprising preferably electrical terminal blocks. The first port 42 and the second port 44 comprise quick connectors.

The internal elements of the board 20 comprise a direct current input stage 48 and an alternating current input stage 50.

The alternating current input stage 50 comprises switches and devices for the electric protection of alternating current and tension, and a tension rectifier to rectify from alternating current to direct current. The alternating current input stage 50 is operatively connected to the starting switch 40, the second port 44 and the direct current input stage 48.

In turn, the direct current input stage 48 comprises switches and devices for the electric protection of direct current and tension. Besides, the direct current input stage 48 is operatively connected to the alternating current input stage 50, the starting switch 40, the first port 42 and a charge control unit 52.

The charge control unit 52 is operatively connected to the direct current input stage 48, the starting switch 40 and an electric energy accumulator 54.

In turn, the electric energy accumulator 54 is operatively connected to an adjustable converter 56 comprising a converter converting the current from a direct current to an alternating current.

The charge control unit 52 is also operatively connected to the adjustable converter 56.

The adjustable converter 56 is operatively connected to an inverter 58, for instance an inverter of grid type, and to a tracking device 60 which is capable to operate as a tracking of the self-consumption power as described in detail below.

The inverter 58 is suitable for the connection to the public power grid R and complies with the directives of the public power grid R, for instance for an automatic release of the system in case of lack of energy from the public power grid R, for the detachment of the meter or for the detachment from the connection to the existing system, for instance in compliance with the rule CEI 0-21.

In addition, the inverter 58 is operatively connected to an inverter output stage 62 comprising switches and devices for the protection of the inverter 58 itself.

In turn, the inverter output stage 62 is operatively connected to the tracking device 60 and the output 46.

Obviously, the inverter 58 may perform the functions of the inverter output stage 62 and the tracking device 60 and more so as to obtain a reduction of the number of components of the system and merge the functions in the inverter 58.

The board 20 is built by collecting its components in an only assembly, cabled and tested, having a degree of protection and type of connection by means of a plug 22, already cabled, of civil or industrial type, allowing the connection directly to the socket P2, visible in FIG. 5, by any non-specialist user, namely by ordinary persons or PEC, as defined by the rules.

Through said features, the board 20 may be conveniently identified as a product for the public in compliance with the rules like a household appliance.

Obviously, instead of the plug 22, already cabled, the board 20 may be provided with an electrical terminal block at the output 46 so as to adapt the electric connection to the board 20 to the features of the electric circuit C.

Figure 7:
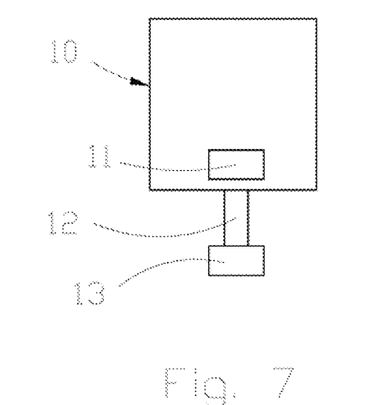

As represented in FIG. 7, the generator 10 comprises a connector 13, preferably a quick connector, at the end of its first connection 12. The connector 13 is shaped in such a way as to allow a quick connection with the first port 42 and/or the second port 44 of the board 20. Hence, the generator 10 is equipped with a connector 13 provided with quick connectors and realized in such a way as to be capable of controlling the immission of energy or tensions even when exposed to a light source in case of photovoltaic generators or concentration generators, unlike the prior art and the products commercialized of this typology.

In particular, the box 11 includes an electronic system that inhibits the production of energy of the generator 10 until the connection is realized between the quick connectors of the connector 13 and the quick connectors of the first port 42 and/or the second port 44 of the board 20. This feature allows the generator 10 to be conveniently identified as a product for the public or as a household appliance in accordance with the rules.

Figure 8:
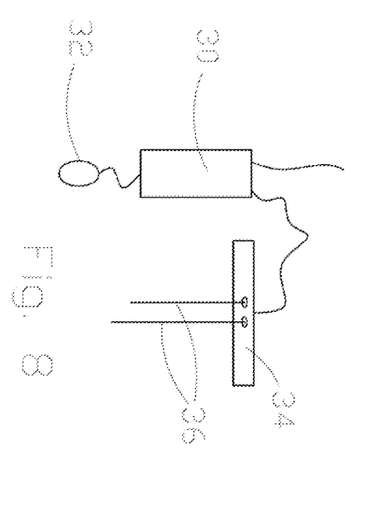

As represented in FIG. 8, the control 30 comprises a ring 32 and a feeder, not visible in the figure, which is conveniently provided with a civil plug. The ring 32, for instance an openable toroid connected to the feeder, is conveniently positioned immediately after the meter T of the public power grid and surrounds the portion of circuit C that protrudes from the meter T.

Accordingly, the control 30, as described, results to be an apparatus that is mountable without any electric intervention and communicates through wireless connections or modulated waves, with the board 20 and the device 34. Also this device is identifiable as a product for the public since the communication takes place without electric connections.

According to a variant of the invention, the board 20 can communicate with the meter T or other elements connected through modulated waves to the electric circuit C.

Preferably, the board 20 reads the modulated waves emitted by the meter T in order to detect one or more of the operation parameters required to adjust the immission of electric energy in the pre-existing electric circuit C, for instance according to the protocols used by the operator of the public grid R of reference, preferably by means of conveyed waves, as described below.

The automatic release and reset device 34 of the meter T comprises a system that is capable of determining through the communication with the board 20 and the control 30 when acting on the lever L by means of its arms 36. Each of the arms performs the function of release (off) or reset (on) of the meter T by directly acting on the lever L in a similar way to the manual handling.

Thus, the device 34 is capable to disarm the meter T from the public power grid R in order to create a stand-alone solution, for instance during the utilization of the self-consumption simultaneously to an accumulation of energy or vice versa.

Avoiding to modify and/or tamper the meter T of the public power grid R and acting through the arms 36 and a suitable electric and/or mechanic mechanism, also the device 34 is conveniently identifiable as a product for the public or as a household appliance. The device 34 comprises conveniently an adhesive portion through which the device is attached to the meter T.

Below, the installation and the operation of the above-mentioned kit are described with reference to FIGS. 5 and 6.

The control 30 is installed proximate to the meter T of a house H and surrounds, through the ring 32, the portion of electric circuit C proximate to the meter T itself. Also this operation may be performed by a common person according to the rules.

Once the control 30 has been installed, the control 30 begins to analyze the energy consumed by the user in the various time slots, which is useful to decide the power to be installed as concerns the other components, for instance one or more boards 20, the number of generators 10 and other parameters.

In other words, the control 30 stores the configuration of the complete kit, namely the power of the generator 10 and the typology of the board 20 that are most suitable to the user. The configuration may be visualized directly by the common person by connecting the control 30, wireless or through a USB cable, to a personal computer.

The energy generator 10 may be an assembly of one or more photovoltaic panels, wind turbines or micro wind turbine blades, photovoltaic concentrators and other current generators as co-generators and may be assembled according to the amount of energy to be produced to meet the annual consumes of the house H and may be installed in total safety thanks to the box 11 that inhibits, manually or automatically, the production of energy of the modules of the generator 10, even if the modules are exposed to the light source or the modules are ready for the production of energy.

Hence, the generator 10 may be assembled by anyone, even if unskilled and non-expert, and connected through its quick connectors 13 to the first port 42 of the board 20 in case the generator 10 produces energy in direct current or to the second port 44 in case the generator 10 produces energy in alternating current.

Through the box it is possible to automatically and/or manually inhibit the production of the generator 10 until the connection has been carried out between generator 10 and board 20, which identifies the devices as a product for the public or as a household appliance.

The electric energy produced by the generator 10 passes through the safety devices contained in the direct current input stage 48. In case the generator 10 produces alternating current energy, the energy is transformed from alternating current to direct current via the integrated rectifier in the alternating current input stage 50 and then, the energy is input in the direct current input stage 48.

From the direct current input stage 48, the electric energy passes through the charge control unit 52 that enters a part of the energy into the electric energy accumulator 54.

The output of the electric energy accumulator 54 is adjusted by the adjustable converter 56 controlled by the tracking device 60 and is limited to a power varying between null power and maximum power. The maximum power depends on the type of connection utilized between the plug 22 and the second socket P2, or on the type of legislation to which the plug 22 and the second socket P2 are subjected.

Within this power range, the inverter 58 is fed according to the need of the users of the house H.

The consumes of the users of the house H are monitored by the control 30 which measures, by means of the toroid contained in the ring 32, any immission of electric energy to the public power grid R.

The ring 32 detects the flow variation of the magnetic field induced by the passage of current. In this way, the ring 32 identifies whether the flow is from the electric circuit C to the public power grid R or from the public power grid R to the electric circuit C.

Said inputs represent an excess production in comparison with the requirements of the users of the house H and consequently, the control 30 sends a wireless signal or a signal via modulated waves or other type of signal to the tracking device 60 which raises, or lowers in the opposite case, the adjustment parameters of the adjustable converter 56. In other words, the tracking device 60 allows to control the electric power fed into the electric circuit C.

In this way, through a predetermined control frequency in the control 30, for instance a frequency equal to a range between 1 Hz and 10 GHz, preferably equal to 50 Hz, the energy fed into the electric circuit C is continuously modulated by the tracking device 60 according to the invention since only the power required for the self-consumption is entered.

According to a variant of the invention, the tracking device 60 monitors constantly the conveyed waves emitted by the meter T and adapts, consequently, the energy fed into the electric circuit C. For instance, in Italy the conveyed waves are read with modulation 2400 bps through decoding in reading data with protocol LONTALK ANSI EUA 709.2-A-2000 for Italy.

Preferably, the input power is kept slightly lower than the power required by the electric circuit C, for instance 1 Watt, so as to avoid the inputs in the public power grid R even more carefully.

When the meter T detects a demand for electric energy from the electric circuit C, the meter T usually communicates this detection through conveyed waves in view of the control of the public power grid R.

Said communication comprising also other operating parameters of the meter T and public power grid R is read by the tracking device 60 in order to consequently adjust the parameters of the electric current that is fed through the plug 22 into the electric circuit C. For instance, the reading of the power required by the electric circuit C to the public power grid R, performed by the meter T, is detected by the tracking device 60 and is utilized to input electric energy with a power that must be as close as possible to the total power required by the electric circuit C at that time. In this way, the consumption of electric energy coming from the public power grid R is minimized.

Thus, the meter T will detect that the electric power required by the electric circuit C to the public power grid R has decreased because a portion of the power required by the electric circuit C is supplied by the apparatus according to the invention.

Preferably, said power supplied by the apparatus to the electric circuit C is maximized on keeping conveniently to the minimum, preferably close to zero, the power required by the electric circuit C from the public power grid R.

Thus, the meter T will detect that the electric power required by the electric circuit C from the public power grid R is proximate to zero and will emit conveyed waves that report said condition so that the tracking device 60 can detect such condition by means of the same conveyed waves.

Hence, the tracking device 60 monitors constantly the conveyed waves emitted by the meter T and adjusts with continuity the immission of electric energy in the electric circuit C through the plug 22.

The control 30 with the ring 32 is therefore optional.

Figure 9:
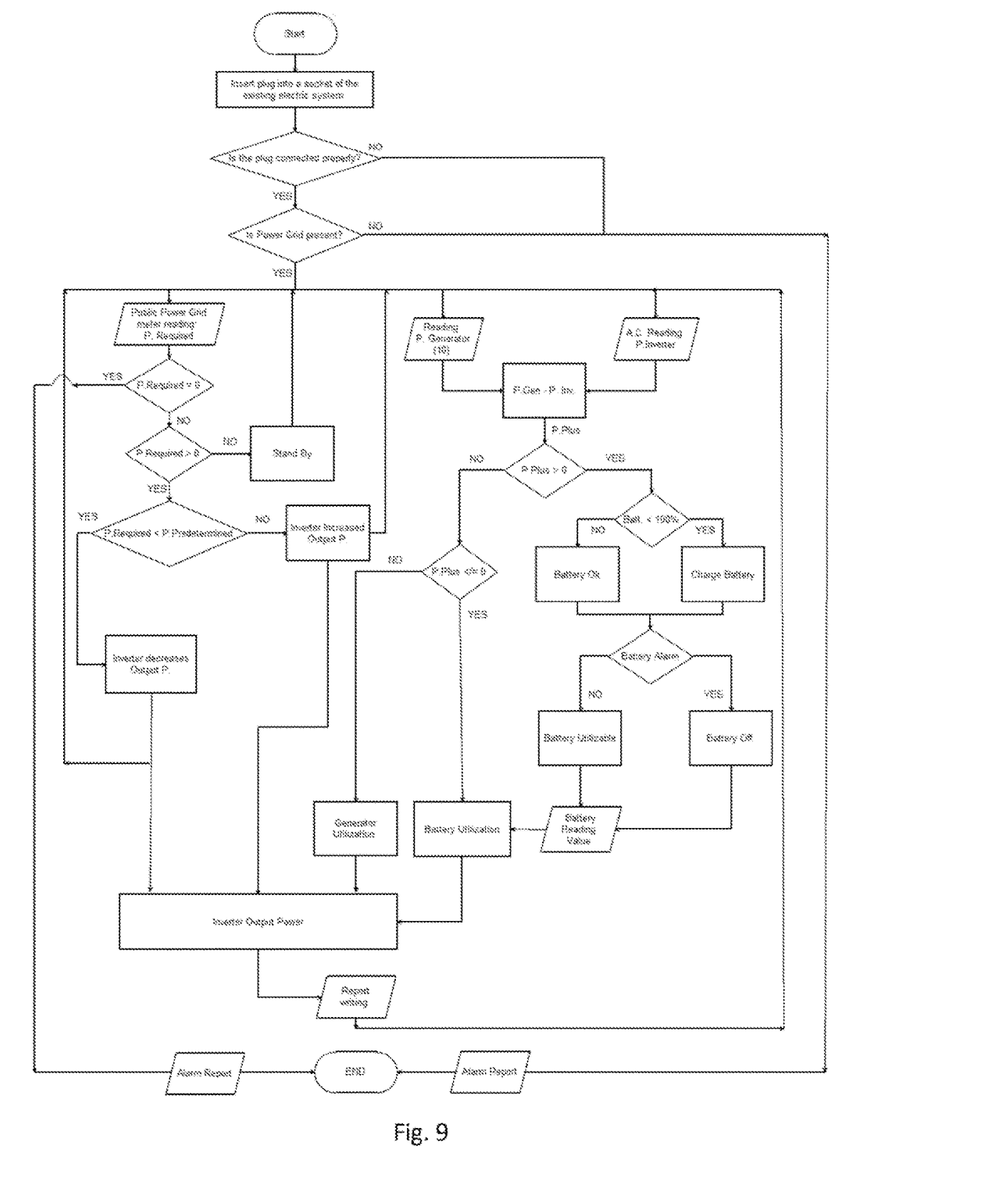
FIG. 9 is a flow diagram of a procedure of working of the apparatus according to the invention.

With reference to FIG. 9, a flow diagram describes schematically a non-limiting example of an operating procedure of the apparatus according to the invention.

All the surplus production of the generator 10 is stored in the accumulator of electric energy 54 so as to be re-circulated in case of lack of production or shutdown of the generator 10. Besides, the passage of the stored energy through the inverter 58 allows the energy to be utilized for the self-consumption while the system remains connected to the public power grid R, which does not occur in the prior art systems that have to work in a stand-alone configuration and therefore, disconnected from the public power grid R.

The accumulator of electric energy 54 is connected, preferably in parallel, with the adjustable converter 56.

The electric energy into alternating current at the output of the inverter 58 passes through the devices of protection of the inverter output stage 62 and is connected through the plug 22 to the existing electric circuit C through the socket P2.

In addition, the tracking device 60 allows a wireless connection or a cable connection to a computer in order to visualize the functionality of the system.

Finally, since the device 34 is in communication with the control 30 and the board 20, the device 34 decides how and when it is necessary to pass from a grid connection to a stand-alone configuration and vice versa.

An example of the conditions under which the device 34 can operate by passing from a grid connection to a stand-alone configuration is a condition of malfunction of the apparatus or other predetermined alarm situations, for instance in case for a certain period of time the mode of delivery of the electric energy from the apparatus is not compatible with the parameters of operation and safety of the public power grid R.

In fact, the device 34 makes impossible, in each operating condition, the feeding into the grid of excesses of production of electric energy and therefore, the device 34 does not require the substitution of the meter T of classic type or unidirectional type with a bidirectional meter. In addition, should it be necessary to vary the system owing to regulatory restrictions, the system may be varied automatically from a grid connection to a stand-alone solution and vice versa.

The device 34 is conveniently glued on the meter T and acts through the two arms 36, controlled individually for instance by an internal electric motor, on the lever L of the meter T itself.

The arms 36 disengage the meter T from the public power grid R automatically, for instance in the following cases: when required by the rules during the utilization of the energy stored, possible energy overproduction in the absence of a bidirectional meter, or in case of an alarm due to a malfunction of the tracking device 60, or in case the user requires the passage from the grid connection to the stand-alone configuration.

The arms 36 have also the opposite function, namely the function of making the meter to the public power grid active in case the grid connection is necessary in compliance with the rules or in view of a proper functioning.

Hence, the purpose of the device 34 is to make unnecessary, as regards the functions and the rules, the substitution of the meter T. In this way, it is possible to avoid the entire bureaucratic procedures to connect a system of production and supplying of electric energy to a grid electric system with installation of a bidirectional meter.

Regardless of the power generated by the generator 10, also in case the generator should have a peak power higher than the power sustainable by the coupling plug 22 and socket P2, the tracking device 60 following the power varies the immission of energy so as to be in compliance with the legislation in force, following the demand for energy for self-consumption by the users of the house (H) within said range.

The board 20 is sufficient in case the peak power required by the users remains under the features deemed necessary to ensure a proper functioning of the socket through which the board 20 is connected to the electric circuit C.

If the demand for power by the domestic users exceeds the features in which an individual socket is dimensioned, it will be sufficient to add one or more additional boards, connected to the electric board 20 and the electric circuit C through additional available sockets.

For instance, the sockets of a civil electric system are usually tested against overtemperatures with a current of 14 A for 1 hour. These overtemperatures are not suitable for the connection of external systems that supply more than 2 kWhp while CEE sockets of industrial type are suitable for the connection of 3 kWhp and more, according to the rules of reference.

The inverter included in the board 20 is conveniently calibrated so as never to exceed the power according to the legislation in force as concerns plug and socket.

If the power to be added is low and reachable by the still available power of the already installed apparatus of immission of electric energy, it is sufficient to raise the immission of power in the electric circuit through the relevant plug. If the maximum power is exceeded with respect to the rules regarding the plug, the plug may be substituted with an industrial plug or it is possible to make a direct connection to the electric circuit by means of the block of terminals.

The inverter introduces electric energy at a voltage higher than the voltage that is normally present for the electric energy fed by the public power grid. In this way, the flow of energy is imposed from the generator to the user and can not go back. Above all, the electric energy flows from the generator to the public power grid and can not go back so that a consumption of electric energy coming from the public power grid is avoided.

The production of electric energy at a voltage higher than the voltage of the public power grid allows that the energy utilizing the electric load, or more generally an electric user, connected to the electric circuit will be only the energy produced by the generator and not the energy supplied by the public power grid since the energy supplied by the public power grid will be utilized only in case the generator is not capable to produce electric energy and/or the accumulator of electric energy is discharged.

Thus, it is possible to obtain a mounting kit that avoids the procedures of the prior art since it is suitable, because of its constructive typology, for a direct connection through the plug 22 to the sockets P2 of the existing civil and/or industrial electric circuit C, the connection being directly effected by anyone, namely a simple user (PEC) or a specialist technician (PES or PAV).

Hence, the house H does not need any electric intervention, the existing electric circuit C is not modified and no testing is required by qualified personnel. In fact, the kit for the immission of electric energy comprises an intelligent and automatic control system to monitor the output power and/or modulated/conveyed waves by means of a tracking device following the consumptions of the users and the requests of the electric circuit from the public power grid, an accumulation of excess power produced by the accumulator of electric energy 54, and all the features that make the invention identifiable as a product for the public or a household appliance.

The kit for the immission of electric energy is conveniently provided with instructions for assembly, use and maintenance for the public.

The kit adapts automatically to the consumptions of the users by storing the energy overproduced directly in the inside of the board and distributing this energy over the whole day without ever physically disconnecting the users from the public power grid.

The kit does not require any bureaucratic procedure for the grid connection.

The kit does not need any engineering study as concerns the dimensioning and is installable by the final user, namely a common person (PEC).

The kit allows to have a continuity of energy to be self-consumed over the whole day and to actually zero the power consumption.

Finally, the tracking system of consumption allows that the energy input in the circuit is equivalent to the energy required by the users and the energy that has not been self-consumed, is not input in the public power grid.

The invention claimed is:

1. Apparatus for the immission of electric energy supplied by a delivery device supplying electric current to a pre-existing electric circuit to which at least an electric user may be connected, said pre-existing electric circuit being connected to an electric energy source delivering electric energy at a first voltage, the pre-existing electric circuit being connected to a pre-existing meter that measures the electric energy required to the electric energy source, said pre-existing meter being adapted to generate conveyed waves to send pieces of information regarding the pre-existing electric circuit including the electric power required by the pre-existing electric circuit from the electric energy source, said apparatus comprising:

connecting means for connecting of the delivery device to the pre-existing electric circuit;

detecting means for detecting the electric energy to be delivered to the preexisting electric circuit;

adjusting means for adjusting the electric power delivered by the delivery device supplying electric current to the pre-existing electric circuit according to the detection performed by the detecting means, the adjusting means connected to the detecting means and to the connecting means;

the adjusting means being adapted to set the voltage of the electric current supplied by the delivery device to the pre-existing electric circuit to a second voltage greater than the first voltage, wherein     the detecting means comprises a detector of the electric power required by the electric circuit to the electric energy source, and     the detector comprises a conveyed waves reader adapted to read the conveyed waves generated by the pre-existing meter and introduced into the pre-existing electric circuit.

2. Apparatus according to claim 1, the pre-existing electric circuit being connected to a pre-existing meter that measures the electric energy required from the electric energy source the meter comprising a lever to control the connection of the pre-existing electric circuit to the electric energy source, wherein a release or reset device is comprised and comprises at least an arm adapted to act on the lever to release or reset the meter when predetermined conditions occur.

3. Apparatus according to claim 1, wherein the delivery device supplying electric current comprises an electric energy generator.

4. Apparatus according to claim 1, wherein the delivery device supplying electric current comprises an electric energy accumulator and wherein electric energy immission means are comprised and are connected to the electric energy accumulator and adjusted by the power adjusting means.

5. Apparatus according to claim 1, wherein the adjusting means comprise a tracking device adapted to minimize the electric energy flowing from the electric energy source to the pre-existing electric circuit.

6. Apparatus according to claim 1, wherein the adjusting means comprise a tracking device adapted to minimize the electric power required by the electric circuit from the electric energy source.

7. Household appliance comprising an apparatus according to claim 1, wherein the electric energy source comprises an external power grid, the pre-existing electric circuit is in a building connected through the pre-existing meter to the external power grid, said pre-existing electric circuit being capable of feeding at least one electric user, the means of connection to the pre-existing electric circuit consist of a connection to connect the household appliance to a pre-existing socket of the pre-existing electric circuit so that the household appliance inputs electric energy directly into the pre-existing electric circuit of the building in order to deliver an electric power that is slightly lower than the power required by the pre-existing electric circuit and/or not to input electric energy into the external power grid.

8. Procedure of immission of electric energy supplied by a delivery device supplying electric current to a pre-existing electric circuit to which at least an electric user may be connected, said preexisting electric circuit being connected to an electric energy source delivering electric energy at a first voltage, a pre-existing meter being connected to the pre-existing electric circuit and adapted to measure the electric power required by the pre-existing energy circuit from the electric energy source in order to determine the electric power that the electric energy source should supply to the pre-existing electric circuit, said pre-existing meter being adapted to emit conveyed waves to send pieces of information concerning the pre-existing electric circuit including the electric power required by the pre-existing electric circuit from the electric energy source, said procedure comprising the following phases:

measuring the electric power required by the pre-existing electric circuit on detecting a first electric power;

inputting electric energy into the pre-existing electric circuit at a second electric power and at a second voltage, the second voltage being higher than the first voltage;

determining the electric power required by the electric circuit to the electric energy source on detecting a third electric power; and     adjusting the second electric power so that the third electric power is positive and close to zero, wherein     the determination of the third electric power takes place by detecting from the pre-existing meter the value of the electric power required by the pre-existing electric circuit from the energy source,     the detection from the pre-existing meter of the value of the third electric power takes place by reading the conveyed waves emitted by the pre-existing meter.

9. Procedure of immission of electric energy according to claim 8, wherein the third electric power is greater than 0 W and lower than the electric power required by the electric circuit, determined as first electric power.

10. Procedure of immission of electric energy according to claim 8, wherein the third electric power is greater than 0 W and lower than 2 W.

11. Procedure of immission of electric energy according to claim 8, wherein the measurement of the electric power required by the pre-existing electric circuit, determined as first electric power, is performed by summing the second electric power of the electric energy input into the pre-existing electric circuit to the third electric power corresponding to the electric power required by the pre-existing electric circuit from the electric energy source.

12. Procedure of immission of electric energy according to claim 8, wherein the following phases are comprised:

measuring the electric energy delivered by an electric current generator, included in the delivery device supplying electric energy, by detecting a fourth electric power;

in case the fourth electric power is greater than the second electric power, the electric energy that has not been input into the pre-existing electric circuit is stored in an electric energy accumulator.

13. Procedure of immission of electric energy according to claim 12, wherein the following phase is comprised:

in case the fourth electric power is lower than the second electric power, the electric energy stored in the electric energy accumulator is input into the pre-existing electric circuit.

14. Procedure of immission of electric energy according to claim 8, wherein the following phase is comprised:

disconnecting the pre-existing electric circuit from the electric energy source in case electric energy flows from the pre-existing electric circuit to the electric energy source.

15. Procedure of immission of electric energy according to claim 8, wherein the following phase is comprised:

disconnecting the pre-existing electric circuit from the electric energy source in case the electric power required by the pre-existing electric circuit to the electric energy source, determined as the third electric power, is equal to 0.

* * * * *

UNITED STATES PATENT AND TRADEMARK OFFICE
CERTIFICATE OF CORRECTION

| | | |
|---|---|---|
| PATENT NO. | : 10,069,305 B2 | Page 1 of 1 |
| APPLICATION NO. | : 14/785570 | |
| DATED | : September 4, 2018 | |
| INVENTOR(S) | : Dario Tagliaro et al. | |

It is certified that error appears in the above-identified patent and that said Letters Patent is hereby corrected as shown below:

On the Title Page

Item (73) Assignee: change "Future Labs S.R.L." to --Future Lab S.R.L.--

Signed and Sealed this
Twenty-third Day of July, 2019

Andrei Iancu
*Director of the United States Patent and Trademark Office*